United States Patent
Wu et al.

(10) Patent No.: US 11,650,945 B2
(45) Date of Patent: May 16, 2023

(54) CASCADE EXTENSION DEVICE AND CASCADE SYSTEM HAVING THE SAME

(71) Applicant: NUVOTON TECHNOLOGY CORPORATION, Hsinchu (TW)

(72) Inventors: Ming-Hung Wu, Hsinchu Science Park (TW); Hao-Yang Chang, Hsinchu Science Park (TW); Fong-Jhu Wu, Hualien (TW); Ciao-Ling Lu, Xinpu Township (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 79 days.

(21) Appl. No.: 17/231,748

(22) Filed: Apr. 15, 2021

(65) Prior Publication Data

US 2021/0326282 A1 Oct. 21, 2021

(30) Foreign Application Priority Data

Apr. 17, 2020 (TW) .................... 109112978

(51) Int. Cl.
  *G06F 13/20* (2006.01)
  *G05B 19/042* (2006.01)
  *F04D 27/00* (2006.01)

(52) U.S. Cl.
  CPC .................. *G06F 13/20* (2013.01)

(58) Field of Classification Search
  CPC ...... G08G 1/04; G10L 21/038; G06F 13/4256
  See application file for complete search history.

(56) References Cited

U.S. PATENT DOCUMENTS

| | | | | |
|---|---|---|---|---|
| 2003/0088423 A1* | 5/2003 | Nishio | .................. | G10L 21/038 704/E21.011 |
| 2011/0153888 A1* | 6/2011 | Sun | ..................... | G06F 13/4256 710/313 |
| 2013/0254632 A1* | 9/2013 | Miyashita | ............... | H03M 5/08 714/776 |
| 2016/0150239 A1* | 5/2016 | Yamaguchi | ............ | H04N 19/85 375/240.25 |
| 2019/0005653 A1* | 1/2019 | Choi | ...................... | G06V 20/52 |
| 2019/0197887 A1* | 6/2019 | Modi | ....................... | G08G 1/04 |

* cited by examiner

*Primary Examiner* — Getente A Yimer
(74) *Attorney, Agent, or Firm* — Snyder, Clark, Lesch & Chung, LLP (57) ABSTRACT

A cascade extension device and a cascade system having the cascade extension device are provided. The cascade extension device includes a control module, a buffer module, a storage module, and a selecting output module. The cascade system includes a processor and a plurality of extension devices. The processor may simultaneously control the plurality of extension devices through judging the data packet received as a write command, a read command, or a bypass command by a plurality of extension devices.

13 Claims, 8 Drawing Sheets

| Time frame | T1 | T2 | T3 | T4 | T5 | T6 |
|---|---|---|---|---|---|---|
| Processor 201 | WD1 | WD2 | RD1 | RD2 | WD3 | WD4 |
| First extension device 202 | WD1 | — | RD1 | — | WD3 | — |
| Second extension device 203 |  | WD2 |  | RD2 |  | WD4 |

FIG. 2B

| Time frame | T1 | T2 | T3 | T4 | T5 | T6 |
|---|---|---|---|---|---|---|
| Processor 201 | WD1 | WD2 | RD1/WD3 | RD2/WD4 | WD5/RD3 | WD6/RD4 |
| First extension device 202 | WD1 | — | RD1/WD3 | — | WD5/RD3 | — |
| Second extension device 203 |  | WD2 |  | RD2/WD4 |  | WD6/RD4 |

| Time frame | T1 | T2 | T3 | T4 | T5 | T6 |
|---|---|---|---|---|---|---|
| Processor 301 | WD1 | WD2 | WD3 | RD1/WD4 | RD2/WD5 | RD3/WD6 |
| First extension device 302 | WD1 | — | — | RD1/WD4 | — | — |
| Second extension device 303 | | WD2 | — | | RD2/WD5 | — |
| Third extension device 304 | | | WD3 | | | RD3/WD6 |

| Time frame | T7 | T8 | T9 | T10 | T11 | T12 |
|---|---|---|---|---|---|---|
| Processor 301 | WD7/RD4 | WD8/RD5 | WD9/RD6 | RD7/WD10 | RD8/WD11 | RD9/WD12 |
| First extension device 302 | WD7/RD4 | — | — | RD7/WD10 | — | — |
| Second extension device 303 | | WD8/RD5 | — | | RD8/WD11 | — |
| Third extension device 304 | | | WD9/RD6 | | | RD9/WD12 |

FIG. 3B

| Time frame | T1 | T2 | T3 | T4 | T5 | T6 | T7 |
|---|---|---|---|---|---|---|---|
| Processor 401 | DDC1 | DDC2 | DDC3 | RD1 | RD2 | WD4 | WD5 |
| First extension device 402 | DDC1 | → | → | RD1 | → | WD4 | → |
| Second extension device 403 | | DDC2 | → | | RD2 | | WD5 |
| | | | Processor 401 receiving DDC3 | | | | |

| Time frame | | T1 | T2 | T3 | T4 |
|---|---|---|---|---|---|
| Processor 501 | $O_1$ | DD1 | RDD1 | RDD2 | RDD3 |
| First extension device 502 | $I_2$ | DD1 | RDD1 | → | → |
| | $O_2$ | | DD1 | | |
| Second extension device 503 | $I_3$ | | DD1 | RDD2 | → |
| | $O_3$ | | | DD1 | |
| Third extension device 504 | $I_4$ | | | DD1 | RDD3 |
| | $O_4$ | | | | DD1 |

(Prior Art)

CASCADE EXTENSION DEVICE AND CASCADE SYSTEM HAVING THE SAME

CROSS-REFERENCE TO RELATED APPLICATION

This application claims priority from Taiwan Patent Application No. 109112978, filed on Apr. 17, 2020, in the Taiwan Intellectual Property Office, the content of which is hereby incorporated by reference in its entirety for all purposes.

BACKGROUND

1. Technical Field

The present disclosure relates to a cascade extension device and a cascade system having the same, particularly to a system capable of controlling a plurality of extension devices simultaneously only by providing two pins on a control terminal.

2. Description of the Related Art

Figure 7:
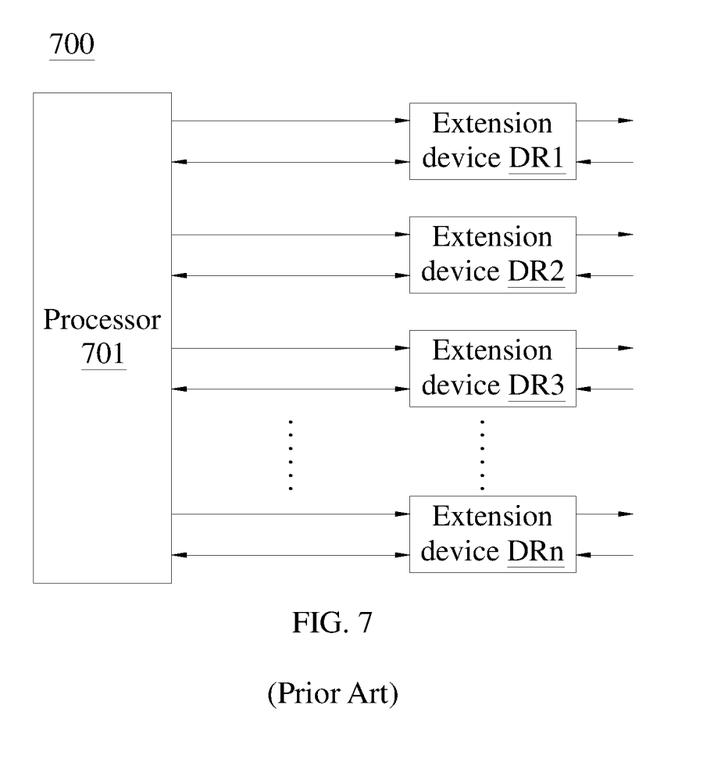
FIG. 7 is a block diagram of the control system according to the prior art.

In the current control driver, a control terminal (e.g., the processor) typically controls a set of drivers with two signal lines. If more sets of drivers are controlled, the control terminal may require using more pins to control a plurality of drivers. Refer to FIG. 7, which illustrates a block diagram of the control system 700 according to the prior art. In FIG. 7, the control system 700 includes a processor 701 and extension devices DR1-DRn, wherein the processor 701 controls each of the extension devices DR1-DRn with two different pins; that is, as the processor 701 controls more extension devices, more pins are needed.

In addition, for transmission methods such as I2C and SMBus, it is necessary to add an address or ID to identify the hardware design of the device, which has increased the complexity of the design.

SUMMARY

In view of the aforementioned problems, the present disclosure provides a cascade extension device, including an extension device input terminal, a control module, and an extension device output terminal. The extension device input terminal is configured to receive a data packet. The control module is connected to the extension device input terminal and includes a decoding unit and a judgment unit, wherein the decoding unit decodes the data packet. When the judgment unit judges that a command of the decoded data packet is received for a first time, the judgment unit executes the command. When the judgment unit judges that the command of the decoded data packet is not received for the first time, the judgment unit sends the data packet to another cascade extension device through the extension device output terminal.

Preferably, when the judgment unit judges that the command is not included in the decoded data packet, the judgment unit may send the data packet to another cascade extension device through the extension device output terminal.

Preferably, the cascade extension device may further include a counter, when the extension device input terminal receives the data packet, the counter begins counting; when the counter reaches to a preset value, the counter is set to zero and the judgment unit considers the command of the decoded data packet to be received for the first time.

Preferably, the cascade extension device may further include a buffer module, a storage module, and a selecting output module. The buffer module is connected to the control module and the extension device input terminal, wherein the data packet is temporarily stored in the buffer module. The storage module is connected to the control module and the buffer module and is configured to store a functional program of an application device and read data. The selecting output module is connected to the control module, the buffer module, and the storage module and is configured to receive the read data or the data packet. The extension device output terminal is connected to the selecting output module and is configured to output the read data or the data packet. Wherein when the judgment unit judges that the command of the data packet is a write command, the control module writes decoded data into the functional program; when the judgment unit judges that the command of the data packet is a read command, the control module outputs the read data to the selecting output module; when the judgment unit judges that the command of the data packet is not received for the first time, the command is considered to be a bypass command, and the judgment unit sends the data packet to another cascade extension device through the extension device output terminal.

Preferably, the data packet may include a command code, and the judgment unit reads the command code to judge that the data packet is the write command or the read command.

Preferably, when the command code read by the judgment unit is the same as the command code of a previous data packet, the data packet is judged to be the bypass command.

Preferably, the control module may include a counter, and the judgment unit may read a count value of the counter to judge that the data packet is the write command, the read command, or the bypass command.

Preferably, the functional program may include a driver program, wherein when the data packet is a write command, the decoding unit decodes the data packet to obtain the parameter data of the driver program.

According to another objective, the present disclosure provides a cascade system, including a processor and a plurality of extension devices. The processor includes an output terminal and an input terminal and a plurality of data packets are sequentially output from the output terminal. A plurality of extension devices as any of the aforementioned cascade extension devices are respectively connected in series to the input terminal of the next extension device through the output terminal, the input terminal of the first extension device in the plurality of extension devices is connected to the output terminal of the processor, and the output terminal of the final extension device in the plurality of extension devices is connected to the input terminal of the processor. wherein the plurality of extension devices respectively judge that the data packet received is a write command, a read command, or a bypass command; when the data packet received is the write command, the data packet is decoded to obtain parameter data of an application device, and the parameter data are written into a functional program of the application device; when the data packet is the read command, read data of the application device are outputted; when the data packet is the bypass command, each of the plurality of extension devices sends the data packet received to the next extension device.

Preferably, the cascade system may include a quantity detection mode, and in the quantity detection mode, the processor sequentially sends a plurality of detection packets to the plurality of extension devices and judges a quantity of the plurality of extension devices based on a send sequence value of detection packet firstly received by the input terminal of the processor.

Preferably, the processor may set a command loop of the data packet based on the quantity of the plurality of extension devices.

Preferably, when the quantity of detection packets outputted by the processor reaches a preset sending limit and the input terminal of the processor has not received any of the plurality of detection packets, the processor enters a device debug mode, the processor sequentially sends a debug packet to the plurality of extension devices through the output terminal thereof, the plurality of extension devices return reply data through the input terminals thereof to the output terminal of the processor after receiving the debug packet, and the processor judges an error position of the plurality of extension devices based on the send sequence value corresponding to the reply data not received through the output terminal.

Preferably, the processor may output a debug command to enter a device debug mode, the processor sequentially sends a debug packet to the plurality of extension devices through the output terminal thereof, the plurality of extension devices return reply data through the input terminals thereof to the output terminal of the processor after receiving the debug packet, and the processor judges an error position of the plurality of extension devices based on a send sequence value corresponding to the reply data not received by the output terminal.

Preferably, the data packet comprises a final command, and each of the plurality of extension devices is switched between a status of executing the write command and a status of executing the read command after receiving the final command.

The cascade extension device and the cascade system having the same according to the present disclosure have at least the following advantages: (1) The control terminal may control a plurality of extension devices by only using two signal lines, and the control terminal may allow more pins to be reserved for other functions, thus significantly reducing the costs of the control driver. (2) Simple point-to-point transmission may be achieved, which improves the design of other transmission methods ($I^2C$, SM bus) that require adding an address or ID to identify the extension devices, thus reducing the complexity of the design. (3) A quantity detection mode and device debug mode are added, which allows users to easily detect the quantity of extension devices, or identify the connection error on a particular extension device.

DESCRIPTION OF THE PREFERRED EMBODIMENTS

To illustrate the technical features, contents, advantages, and achievable effects of the present disclosure, the embodiments together with the accompanying drawings are described in detail as follows. However, the drawings are used only for the purpose of indicating and supporting the specification, which is not necessarily the real proportion and precise configuration after the implementation of the present disclosure. Therefore, the relations of the proportion and configuration of the accompanying drawings should not be interpreted to limit the actual scope of implementation of the present disclosure.

Figure 1A:
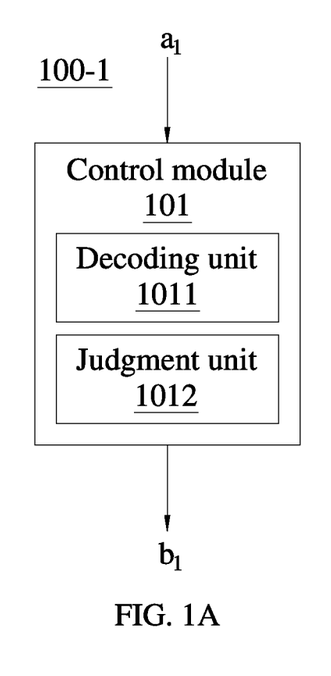
FIG. 1(A) is a block diagram of the cascade extension device according to an embodiment of the present disclosure.

FIG. 1(A) is a block diagram of the cascade extension device according to an embodiment of the present disclosure. Referring to FIG. 1(A), the cascade extension device 100-1 includes an extension device input terminal $a_1$, a control module 101, and an extension device output terminal $b_1$. The extension device input terminal $a_1$ is configured to receive a data packet. The control module 101 is connected to the extension device input terminal $a_1$ and includes a decoding unit 1011 and a judgment unit 1012, wherein the decoding unit 1011 decodes the data packet. When the judgment unit 1012 judges that a command of the decoded data packet is received for the first time, the judgment unit 1012 executes the command When the judgment unit 1012 judges that the command of the decoded data packet is not received for the first time, the judgment unit 1012 sends the data packet to another cascade extension device through the extension device output terminal $b_1$.

According to an embodiment of the present disclosure, when the judgment unit 1012 judges that the command is not included in the decoded data packet, the judgment unit 1012 sends the data packet to another cascade extension device through the extension device output terminal $b_1$.

According to an embodiment of the present disclosure, the cascade extension device 100-1 may include a counter, wherein when the extension device input terminal $a_a$ receives the data packet, the counter begins counting; when the counter value reaches a preset value, the counter is set to zero and the judgment unit 1012 considers the command of the decoded data packet to be received for the first time.

It should be noted that the judgment unit 1012 may judge whether the command of the decoded data packet is received for the first time based on various conditions. For instance, the judgment unit 1012 may make judgments based on the type of command. Provided that when the judgment unit 1012 sequentially receives three write commands and three read commands, the judgment unit 1012 may judge that the first write command is received for the first time, and the types of the second write command and the third write command are the same as that of the first write command. Therefore, the judgment unit 1012 may judge that the second write command and the third write command are not received for the first time.

In an embodiment, the judgment unit 1012 may make judgments based on a count value and an operating value. The judgment unit 1012 may count the count value after receiving a command every time, and the count value counted may be reset to zero when reaching the operating value. When the judgment unit 1012 receives a command and the count value is 0, the judgment unit 1012 judges that the received command is received for the first time and then counts the count value; when the judgment unit 1012 receives the command and the count value is not 0, the judgment unit 1012 judges that the received command is not received for the first time and then counts the count value. In other embodiments, the judgment unit 1012 may also count down the count value after receiving a command every time, and when the count value after the countdown reaches zero, the count value may return to the operating value.

Figure 1B:
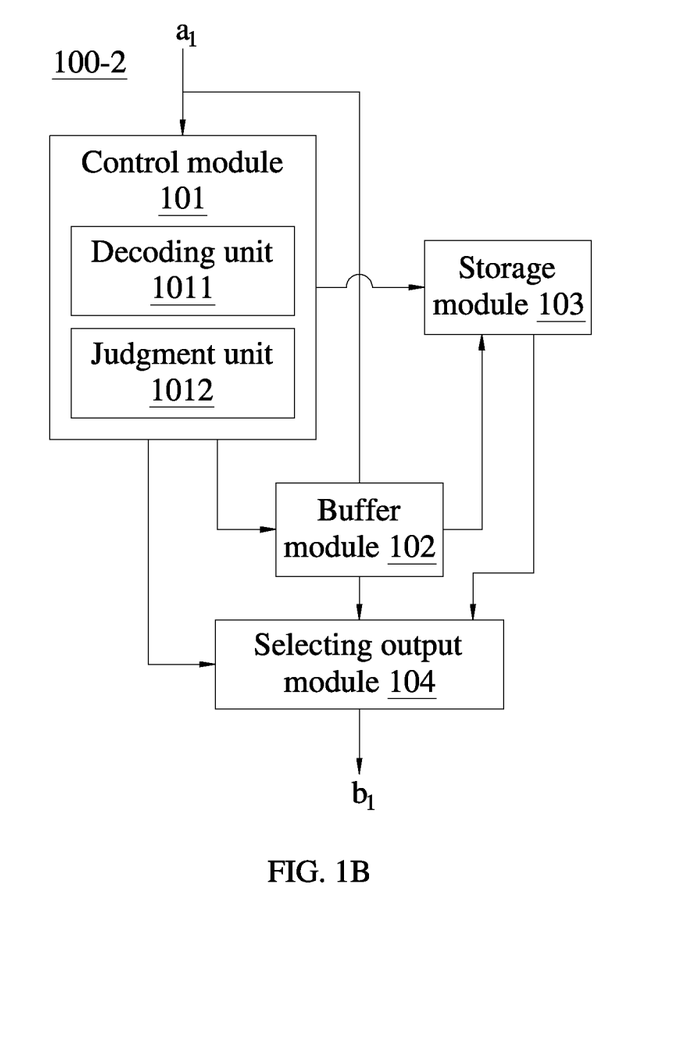
FIG. 1(B) is a block diagram of the cascade extension device according to an embodiment of the present disclosure.

FIG. 1(B) is a block diagram of the cascade extension device according to an embodiment of the present disclosure. Referring to FIG. 1(B), compared to the cascade extension device 100-1, the cascade extension device 100-2 further includes a buffer module 102, a storage module 103, and a selecting output module 104. The cascade extension device 100-2 receives a data packet from the input terminal al of the extension device, and the control module 101 is connected to the extension device input terminal $a_1$ and includes a decoding unit 1011 and a judgment unit 1012, wherein the decoding unit 1011 decodes the data packet. The buffer module 102 is connected to the control module 101 and the extension device input terminal $a_1$, wherein the data packet is temporarily stored in the buffer module 102.

The storage module 103 is connected to the control module 101 and the buffer module 102 and is configured to store a functional program of an application device and read data. The selecting output module 104 is connected to the control module 101, the buffer module 102, and the storage module 103 and is configured to receive the read data or the data packet. The extension device output terminal bi is connected to the selecting output module 104 and is configured to output the read data and the data packet. Specifically, when the judgment unit 1012 judges that the command of the data packet is a write command, the control module 101 writes decoded data into the functional program; when the judgment unit 1012 judges that the command of the data packet is a read command, the control module 101 outputs the read data to the selecting output module 104; when the judgment unit 1012 judges that the command of the data packet is not received for the first time, the command is considered to be a bypass command, that is, the cascade extension device 100-1 bypasses this received data packet and the judgment unit 1012 sends the data packet to another cascade extension device through the extension device output terminal $b_1$.

According to an embodiment of the present disclosure, the functional program may include a driver program, wherein when the data packet is a write command, the decoding unit 1011 decodes the data packet to obtain the parameter data of the driver program. According to an embodiment of the present disclosure, the application device may be a fan, and the functional program may include a driver program to drive the fan with parameter data. The parameter data may be, for instance, the expected rotation speed of the fan. In addition, the cascade extension device 100-2 reads the data outputted from the fan as the read data, and the read data may be the actual rotation speed of the fan. However, the present disclosure is not limited thereto, and the read data may be data describing any state of the fan.

According to an embodiment of the present disclosure, the data packet may include a command code, and the judgment unit 1012 may read the command code to judge that the data packet is the write command or the read command. When the decoding unit 1011 decodes the data packet, the data of a particular bit in the data packet may be utilized as a command for writing or reading. When the particular bit indicates a write command, the control module 101 writes the decoded data into the storage module 103; when particular bit indicates a read command, the control module 101 outputs the read data in the storage module 103. In addition, when the write command or read command judged by the judgment unit 1012 is the same as the command received in the previous data packet, the judgement unit 102 judges that the data packet indicates a bypass command, and the control module 101 outputs the data packet temporarily stored in the buffer module 102 to the next cascade device.

According to an embodiment of the present disclosure, the control module 101 may include a counter, and the judgment unit 1012 may read a count value of the counter to judge that the data packet is the write command, the read command, or the bypass command. For instance, the counter may be preset with an operating value, and the control module 101 subtracts the value by one every time a data packet is received and resets the value to the preset operating value after returning to zero. The judgment unit 1012 performs a write or read operation when a specific operating value is read. However, the present disclosure is not limited thereto. The counter may also be preset to zero, which increases by one every time a data packet is received, and then return to zero until the preset operating value is reached.

Figure 2A:
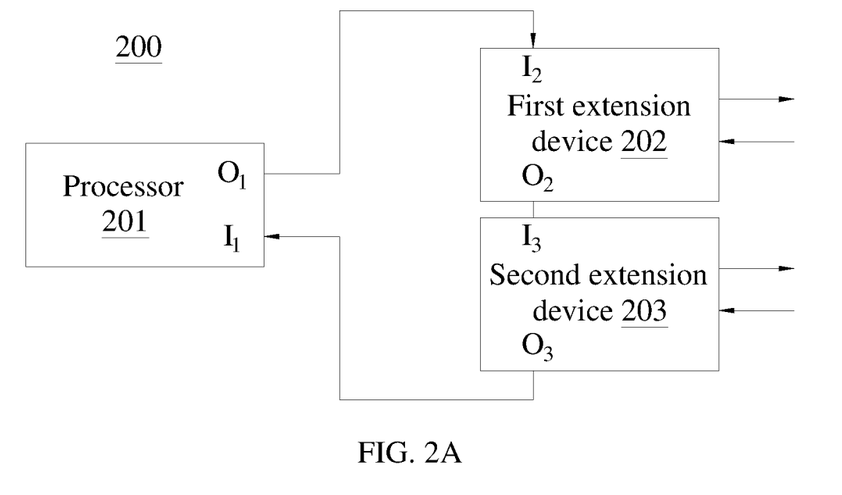
FIG. 2(A) is a block diagram of the cascade system according to an embodiment of the present disclosure.
Figure 2B:
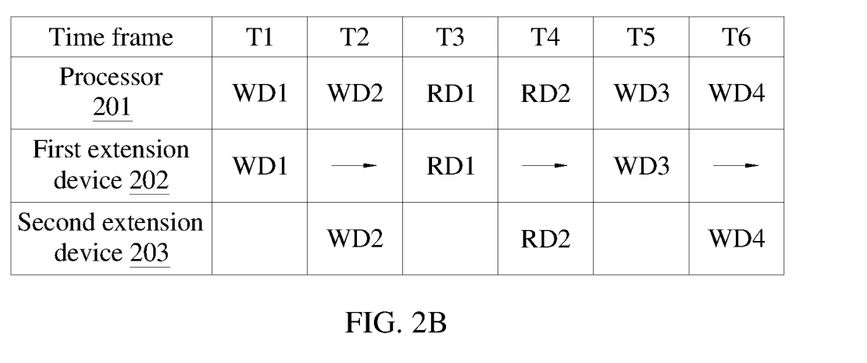
FIG. 2(B) is a schematic diagram showing the scheduling of the cascade system according to an embodiment of the present disclosure.

Refer to FIG. 2(A) and FIG. 2(B), which are a block diagram of the cascade system and a schematic diagram showing the scheduling thereof according to an embodiment of the present disclosure. Referring to FIG. 2(A), according to an embodiment of the present disclosure, a cascade system 200 is provided, including a processor 201, a first extension device 202, and a second extension device 203. The processor 201 includes an output terminal $O_1$ and an input terminal $I_1$, and the output terminal $O_1$ sequentially outputs data packets. The first extension device 202 includes a first input terminal $I_2$ and a first output terminal $O_2$, and the first input terminal $I_2$ is connected to the output terminal $O_1$ of the processor 201. The second extension device 203 includes a second input terminal $I_3$ and a second output terminal $O_3$, and the second input terminal $I_3$ is connected in series to the first output terminal $O_2$ and the second output terminal $O_3$ is connected in series to the input terminal $I_1$ of the processor 201.

According to an embodiment of the present disclosure, the first extension device 202 judges whether the command of the data packet received is received for the first time. If yes, the judgment unit of the first extension device 202 executes the command. If no, the judgment unit of the first extension device 202 sends the data packet to the second extension device 203 through the first output terminal $O_2$.

According to an embodiment of the present disclosure, when the judgment unit of the first extension device 202 judges that the command is not included in the decoded data packet, the judgment unit of the first extension device 202 may send the data packet to the second extension device 203 through the first output terminal $O_2$.

According to an embodiment of the present disclosure, the first extension device 202 and the second extension device 203 respectively judge whether the data packet received is a write command, a read command, or a bypass command. When the data packet is the write command, the data packet is decoded to obtain parameter data of an application device, and write the parameter data into a functional program of the application device; when the data packet is the read command, read data of the application device are outputted; when the data packet is the bypass command, each of the plurality of extension devices sends the data packet to the next extension device.

Refer to FIG. 2(A) and FIG. 2(B), as shown in FIG. 2(B), the cascade system according to an embodiment of the present disclosure may control two extension devices 202 and 203 under the condition that only two pins (output terminal $O_1$ and input terminal $I_1$) are provided. The control method is described in detail as follows: As shown in FIG. 2(B), in the first time frame T1, the processor 201 outputs the first data packet which includes the first write command WD1, and the first extension device 202 receives the first data packet and executes the first write command WD1. In the second time frame T2, the processor 201 outputs the second data packet which includes the second write command WD2. At the time, the first extension device 202 judges that the second data packet is the same write command as the first data packet, and therefore judges that the second data packet is a bypass command. The first extension device 202 does not receive the second write command WD2, and only sends the second data packet (as indicated by an arrow in the figure "only sending data packets instead of receiving and executing commands"), which is received by the second extension device 203. The second extension device 203 judges the second data packet and executes the second write command WD2. In the present embodiment, the time frame represents the quantity of data packets received and does not refer to a fixed time interval. For instance, the first time frame is the interval when the first data packet is received, and the second time frame is the interval when the second data packet is received, and the reset may be deduced in the same manner.

Next, in the third time frame T3, the first extension device 202 judges the third data packet and executes the first read command RD1; in the fourth time frame T4, the second extension device 203 judges the fourth data packet and executes the second read command RD2. Specifically, after the first extension device 202 executes the first read command RD1 in the third time frame T3, in the fourth time frame T4, the first extension device 202 judges that the command code of the fourth data packet of the second read command RD2 is the same as the command code of the third data packet of the first read command RD1. The fourth data packet of the second read command RD2 is judged as a bypass command; in other words, when receiving at least two the same commands sequentially, the extension device processes the first command only and considers the other command as the bypass command. Therefore, the first extension device 202 does not receive the fourth data packet, but only sends the fourth data packet, and the second extension device 203 receives and executes the second read command RD2.

In another embodiment, the control module 101 may include a counter, and the judgment unit 1012 may read a count value of the counter to judge that the data packet is the write command, the read command, or the bypass command. The schematic diagram of the scheduling in FIG. 2(B) is taken as an example. The initial count values of the counters of both the first extension device 202 and the second extension device 203 may be set to 4. As long as the data packet is received, the count value of the counter is decreased by 1, and once the count value is decreased to 0, the value may automatically return to 4. In addition, as long as the count value of the counter is 4, the data packet is judged to be a write command; as long as the count value of the counter is 2, the data packet is judged to be a read command. In addition, when the count value of the counter is 1 or 3, the data packet is judged to be a bypass command. The first extension device 202 is taken as an example. The count value in the first time frame T1 is 4, and the data packet is judged to be a write command. In the second time frame T2, the count value is 3, and the data packet is judged to be a bypass command. In the third time frame T3, the count value is 2, and the data packet is judged to be a read command. In the fourth time frame T4, the count value is 1, and the data packet is judged to be a bypass command. At the time, the count value is decreased to 0 and automatically returns to 4. In the fifth time frame T5, the data packet is judged to be a write command. That is, the write and read commands performed in the first time frame T1 to the fourth time frame T4 may be repeated with a period of four time frames after the fourth time frame T4. That is, in the fifth time frame T5 to the eighth time frame T8 and the ninth time frame T9 to the twelfth time frame T12, the loop mode of the write command and read command as mentioned above is repeated, and the reset may be deduced in the same manner, as shown in FIG. 2(B).

In another embodiment, in contrast to that shown in FIG. 2(B), the aforementioned write commands executed in the first time frame T1 to the second time frame T2 may be repeated with a period of two time frames after the second time frame T2. That is, two time frames are used as a period of the command loop, and write commands are respectively executed at the first extension device 202 and the second extension device 203 in the third time frame T3 and the fourth time frame T4. Similarly, write commands are respectively executed at the first extension device 202 and the second extension device 203 in the fifth time frame T5 and the sixth time frame T6, and the reset may be deduced in the same manner without executing read commands.

In the aforementioned state, the data packet may include a final command, and the extension device is switched between a status of executing the write command and a status of executing the read command after receiving the final command. The schematic diagram of the scheduling in FIG. 2(B) is taken as an example. The data packet of the second write command WD2 may include the final command. Since the first extension device 202 decodes first and then receives the final command, the first extension device 202 is switched from a status of executing the write command to a status of executing the read command, so that the read command is executed in the third time frame. Likewise, the second extension device 203 also decodes when receiving the data packet of the second write command WD2 and therefore receives the final command. When the second extension device 203 receives the data packet in the fourth time frame T4, the second extension device 203 executes the read command according to the data packet.

Figure 2C:
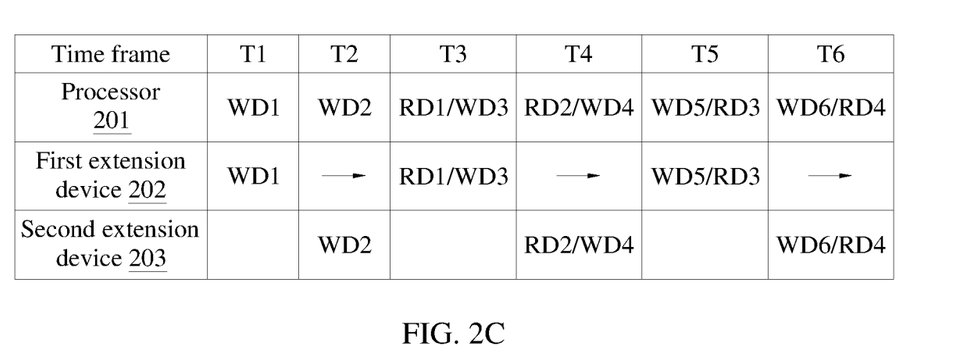
FIG. 2(C) is a schematic diagram showing the scheduling of the cascade system according to an embodiment of the present disclosure.

Next, please refer to the schematic diagrams of the cascade system according to an embodiment of the present disclosure shown in FIG. 2(A) and FIG. 2(C). In the present embodiment, in the first time frame T1, the processor 201 outputs the first data packet which includes the first write command WD1, and the first extension device 202 receives the first data packet and executes the first write command WD1; in the second time frame T2, the processor 201 outputs the second data packet which includes the second write command WD2, the first extension device 202 sends the second data packet, and the second extension device 203 receives and executes the second write command WD2; in the third time frame T3, the processor 201 outputs the third data packet which includes the third write command WD3 and the first read command RD1, and the commands are received and executed by the first extension device 202; in the fourth time frame T4, the processor 201 outputs the fourth data packet which includes the fourth write command WD4 and the second read command RD2, and the first extension device 202 only sends the data packet without executing the commands which are received and executed by the second extension device 203. Then, the period of two time frames is repeated, as shown in the figure.

Figure 3A:
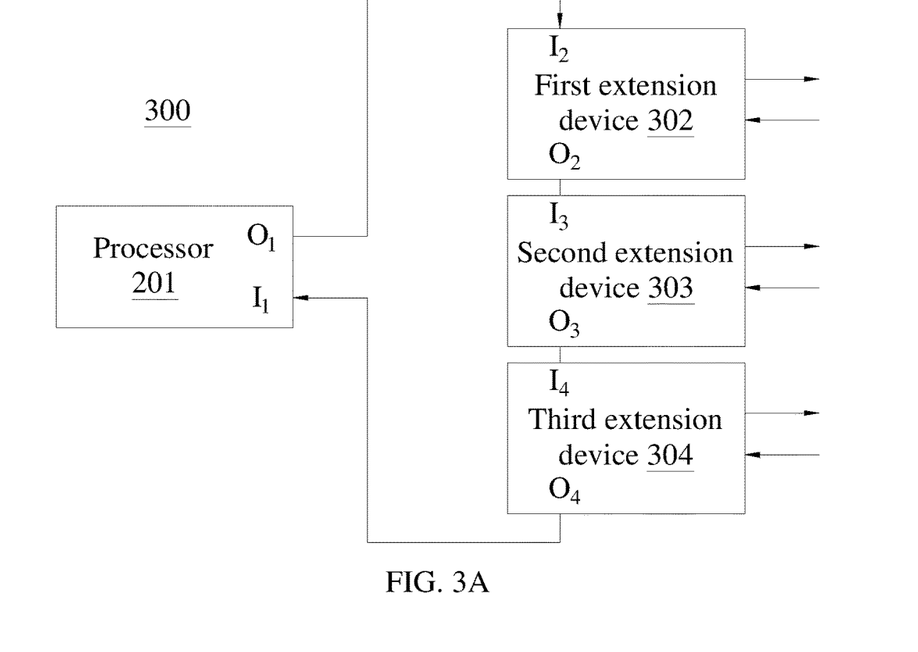
FIG. 3(A) is a block diagram of the cascade system according to another embodiment of the present disclosure.
Figure 3B:
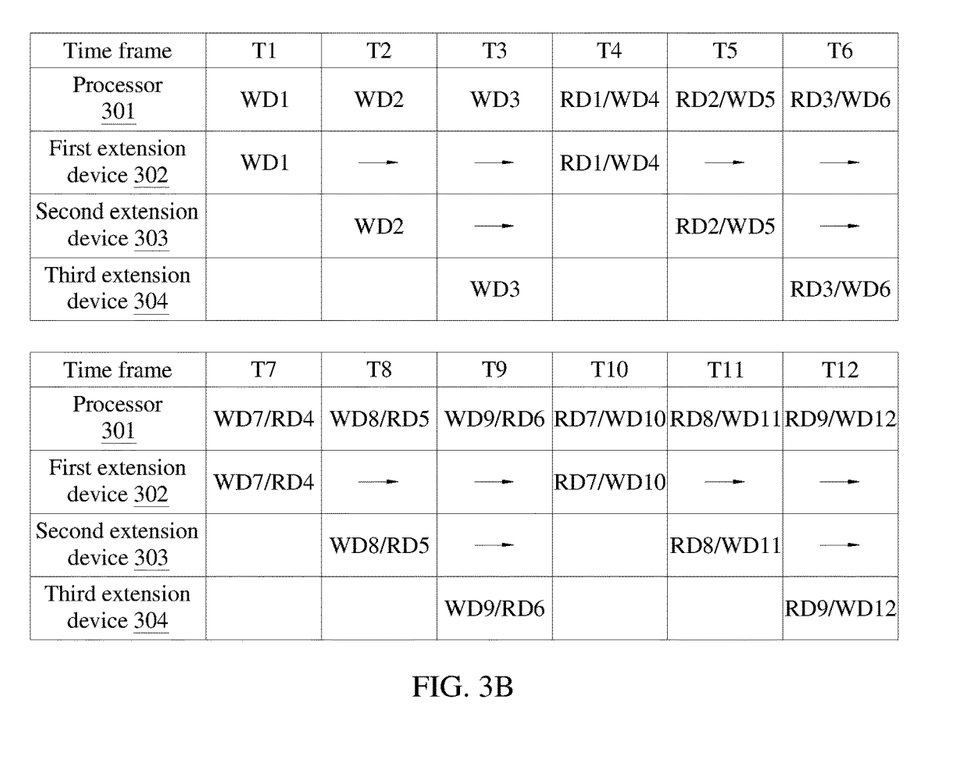
FIG. 3(B) is a schematic diagram showing the scheduling of the cascade system according to another embodiment of the present disclosure.

Refer to FIG. 3(A) and FIG. 3(B), which are a block diagram of the cascade system and a schematic diagram showing the scheduling thereof according to another embodiment of the present disclosure. In FIG. 3(A), the cascade system 300 includes a processor 301, a first extension device 302, a second extension device 303, and a third extension device 304. The processor 301 includes an output terminal $O_1$ and an input terminal $I_1$. The first extension device 302 includes a first input terminal $I_2$ and a first output terminal $O_2$. The first input terminal $I_2$ is connected to the output terminal $O_1$ of the processor 301. The second extension device 303 includes a second input terminal $I_3$ and a second output terminal $O_3$. The second input terminal $I_3$ is connected in series to the first output terminal $O_2$. The third extension device 304 includes a third input terminal $I_4$ and a third output terminal $O_4$. The third input terminal $I_4$ is connected in series to the second output terminal $O_3$. The third output terminal $O_4$ is connected in series to the input terminal $I_1$ of the processor 301.

Referring to FIG. 3(A) and FIG. 3(B) at the same time, in the first time frame T1, the processor 301 outputs the first data packet that includes the first write command WD1, and the first extension device 302 receives and executes the first write command WD1; in the second time frame T2, the processor 301 outputs the second data packet which includes the second write command WD2, the first extension device 302 sends the second data packet, and the second extension device 303 receives and executes the second write command WD2; in the second time frame T3, the processor 301 outputs the third data packet which includes the third write command WD3, the first extension device 302 and the second extension device 303 send the third data packet, and the third extension device 304 receives and executes the third write command WD3; in the fourth time frame T4, the processor 301 outputs the fourth data packet which includes the fourth write command WD4 and the first read command RD1, and the commands are received and executed by the first extension device 302; in the fifth time frame T5, the processor 301 outputs the fifth data packet which includes the fifth write command WD5 and the second read command RD2, and the first extension device 302 only sends the data packet without executing the commands which are received and executed by the second extension device 303. in the sixth time frame T6, the processor 301 outputs the sixth data packet which includes the sixth write command WD6 and the third read command RD3, and the first extension device 302 and the second extension device 303 only send the data packet without executing the commands which are received and executed by the third extension device 304. Then, the period of three time frames is repeated, as shown in the figure from the seventh time frame T7 to the twelfth time frame T12.

According to an embodiment of the present disclosure, the cascade system may include a quantity detection mode, and in the quantity detection mode, the processor sequentially sends a plurality of detection packets to the extension devices and judges the quantity of the plurality of extension devices based on a send sequence value of detection packet firstly received by the input terminal of the processor.

Figure 4:
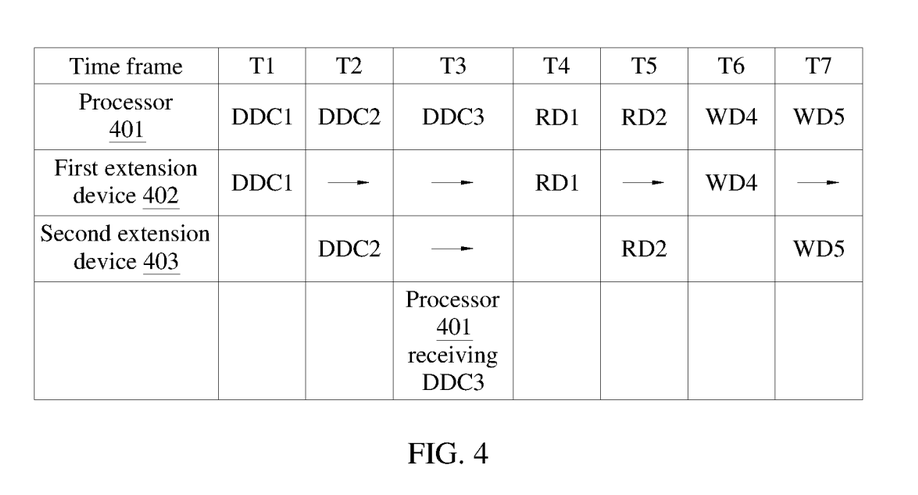
FIG. 4 is a schematic diagram showing the quantity detection mode of the cascade system according to an embodiment of the present disclosure.

FIG. 4 is a schematic diagram showing the quantity detection mode of the cascade system according to an embodiment of the present disclosure. In the present embodiment, the cascade system includes a processor 401, a first extension device 402, and a second extension device 403. Under the condition of not knowing how many devices are connected in series, the processor 401 may test the quantity of the extension devices through detection commands and output the first detection packet in the first time frame T1, which includes the first detection command DDC1. The first extension device 402 executes the first detection command DDC1. The processor 401 outputs the second detection packet in the second time frame T2, which includes the second detection command DDC2. The first extension device 402 judges that the command is repeated and sends the second detection packet to the second extension device 403, and the second extension device executes the second detection command DDC2. The processor 401 outputs the third detection packet in the third time frame T3, which includes the third detection command DDC3. The first extension device 402 and the second extension device 403 judge that the command is repeated and send the third detection packet backward. However, only the input terminals of the processors of the first extension device 402 and the second extension device 403 are connected in series to receive the third detection packet of the third detection command DDC3. By judging that the send sequence value of the detection packet is three, it may be judged that there are only two extension devices. Therefore, the processor 401 correspondingly corrects the command outputted and outputs the data packet with a loop of two cascade extension devices (e.g., the read command as shown in the fourth time frame T4 and the fifth time frame T5 and the write command as shown in the sixth time frame T6 and the seventh time frame T7), and the reset may be deduced in the same manner for the execution of the control over the extension devices 402 and 403.

In the present embodiment, the processor 401 may set a preset sending limit, for instance, sending up to 100 detection packets. When the quantity of detection packets outputted by the processor reaches a preset sending limit and the input terminal of the processor has not received any of the plurality of detection packets, meaning that there may be an open circuit in the transmission line or one of the extension devices malfunctions, the processor enters the device debug mode, the output terminal of the processor sequentially sends a debug packet to the plurality of extension devices, the plurality of extension devices return reply data through the input terminals thereof to the output terminal of the processor after receiving the debug packet, and the processor judges an error position of the plurality of extension devices based on a send sequence value corresponding to the reply data not received through the output terminal (i.e., the location of an open circuit or which extension device malfunctions). The debug method is to be further described in the following embodiment.

According to an embodiment of the present disclosure, the processor may output a debug command to enter a device debug mode, the output terminal of the processor sequentially sends a debug packet to the plurality of extension devices, the plurality of extension devices return reply data through the input terminals thereof to the output terminal of the processor after receiving the debug packet, and the processor judges an error position of the plurality of extension devices based on the send sequence value corresponding to the reply data not received by the output terminal.

Figure 5A:
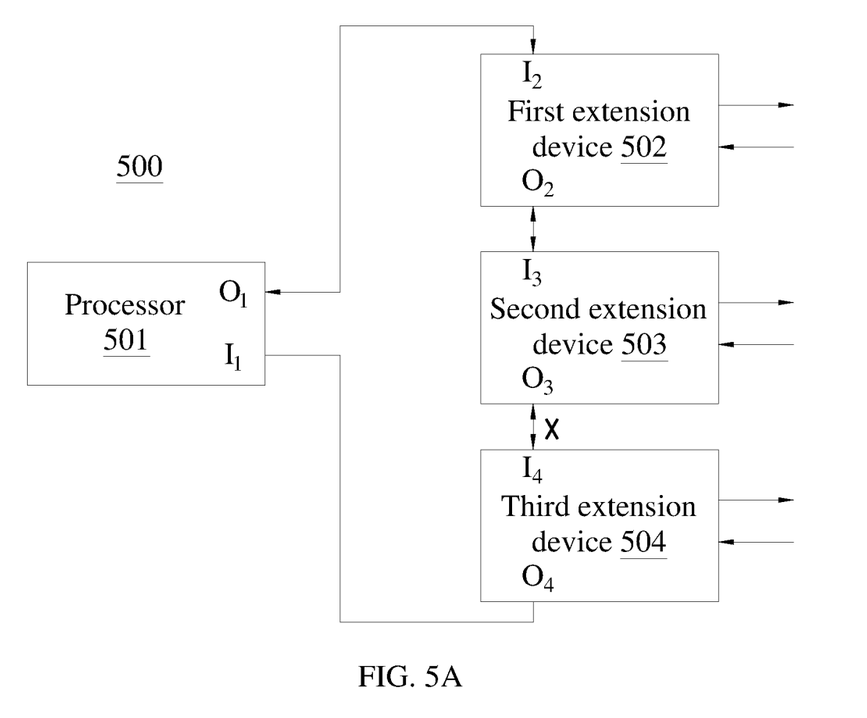
FIG. 5(A) and FIG. 5(B) are schematic diagrams showing the device debug mode of the cascade system according to an embodiment of the present disclosure.
Figure 5B:
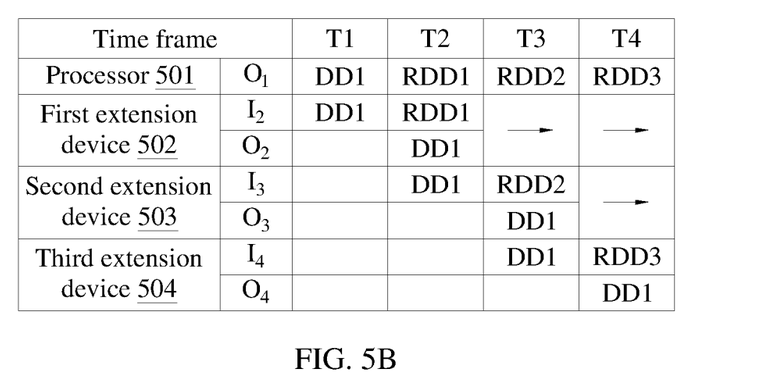

Refer to FIG. 5(A) and FIG. 5(B), which are schematic diagrams showing the device debug mode of the cascade system according to an embodiment of the present disclosure. Since the system provided by the present disclosure adopts a cascade mode, when the external circuit of the extension device is disconnected or the internal circuit of the extension device is disconnected, the entire system becomes abnormal. To facilitate the user to debug the connection abnormality, the cascade system provided by the present disclosure further includes a device debug mode. The embodiment as shown in FIG. 5(A) and FIG. 5(B) is taken as an example. The cascade system 500 includes a processor 501, a first extension device 502, a second extension device 503, and a third extension device 504. The processor 501 includes an output terminal $O_1$ and an input terminal $I_1$. The first extension device 502 includes a first input terminal $I_2$ and a first output terminal $O_2$. The first input terminal $I_2$ is connected to the output terminal $O_1$ of the processor 501. The second extension device 503 includes a second input terminal $I_3$ and a second output terminal $O_3$. The second input terminal $I_3$ is connected in series to the first output terminal $O_2$. The third extension device 504 includes a third input terminal $I_4$ and a third output terminal $O_4$. The third input terminal $I_4$ is connected in series to the second output terminal $O_3$. The third output terminal $O_4$ is connected in series to the input terminal $I_1$ of the processor 501.

In the first time frame T1, the processor 501 sends the first debug packet to issue a debug command DD1 to the first extension device 502; In the second time frame T2, the first extension device 502 returns the reply data RDD1 to the processor 501 through the first input terminal $I_2$ and also sends the debug command DD1 issued by the processor 501 to the second extension device 503 through the first output terminal $O_2$ at the same time; in the third time frame T3, the second extension device 503 returns the reply data RDD2 through the second input terminal $I_3$ and also sends the debug command DD1 to the third extension device 504 through the second output terminal $O_3$ at the same time; in the fourth time frame T4, the third extension device 504 returns the reply data RDD3 through the third input terminal $I_4$, and since the processor 501 receives the returned reply data RDD1, RDD2, and RDD3, it may be known that the internal connection of any extension device in the system is not disconnected, and the connection between each extension device is not disconnected.

However, if the third input terminal $I_4$ and the second output terminal $O_3$ are disconnected, such as the connection state of the present embodiment as shown in the crossed position in FIG. 5(A), the third extension device 504 may not be able to receive the debug command DD1 in the third time frame T3. Processor 501 is also unable to receive the reply data RDD3 or the send sequence value in the fourth time frame T4. The processor 501 may be able to identify the problem of the third extension device 504, and the user may be able to find errors based on the circuit connection of the third extension device 504 so as to accelerate the debug operation.

Figure 6:
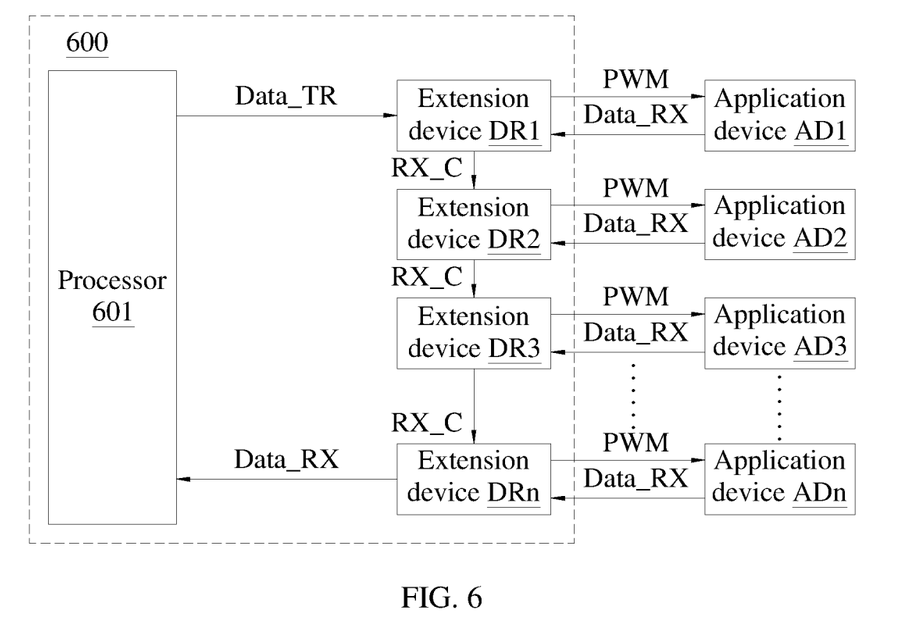
FIG. 6 is an application block diagram of the cascade system according to an embodiment of the present disclosure.

Next, please refer to FIG. 6, which is an application block diagram of the cascade system according to an embodiment of the present disclosure. According to an embodiment of the present disclosure, the cascade system 600 includes a processor 601 and extension devices DR1-DRn. The cascade system 600 is provided to drive the application devices AD1-ADn or set the parameters of the application devices AD1-ADn and may read the data outputted by the application devices AD1-ADn. The control signal PWM is driven or set by the extension device DR1-DRn through the input terminal of the application device AD1-ADn, and the application devices AD1-ADn are respectively connected to the extension devices DR1-DRn and output the signal Data_RX. The signal Data_RX is sent to the processor 601 through the extension devices DR1-DRn, and the processor 601 may read the data of each application device AD1-ADn through the signal Data_RX. According to another embodiment of the present disclosure, each extension device DR1-DRn is a driver. According to another embodiment of the present disclosure, the processor 601 is a microcontroller (MCU), each extension device DR1-DRn is a driver or a driving chip, and each drive application device AD1~ADn is a fan. Specifically, Data_TR is a signal sent to each driver by the microcontroller, and the signal is then sent to each fan by the control logic of each driver. The microcontroller may receive the data of each fan (such as the actual rotation speed of the fan) through the signal Data_RX. When the microcontroller needs to control a plurality of sets of fans, the RX_C signal of each driver may be used to connect the next driver in series to accomplish the control over the plurality of sets of fans.

According to the embodiments of the present invention, the data packet can carry at least one command, and the extension device can decode the data packet to obtain the command; or, the extension device stores multiple commands in advance, the data packet carries data indicative of one of the multiple commands, and the extension device executes the command corresponding to the data; or, the extension device stores multiple commands in advance, and selects one of the multiple commands based on the above-mentioned judgement scheme, such as the judgement scheme using the final command or the counter, or the judgement scheme of considering the repeated command as the bypass command.

In this application, the term "module" or the term "unit" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above description is merely illustrative rather than restrictive. Any equivalent modifications or alterations without departing from the spirit and scope of the present disclosure are intended to be included in the following claims.

What is claimed is:

1. A cascade extension device, comprising:
an extension device input terminal configured to receive a data packet;
a control module connected to the extension device input terminal and comprising a decoding unit and a judgment unit, wherein the decoding unit decodes the data packet; and
an extension device output terminal;
wherein when the judgment unit judges that a command of the decoded data packet is received for a first time, the judgment unit executes the command, and when the judgment unit judges that the command of the decoded data packet is not received for the first time, the judgment unit sends the data packet to another cascade extension device through the extension device output terminal.

2. The cascade extension device according to claim 1, wherein when the judgment unit judges that the command is not comprised in the decoded data packet, the judgment unit sends the data packet to another cascade extension device through the extension device output terminal.

3. The cascade extension device according to claim 1, further comprising a counter, wherein when the extension device input terminal receives the data packet, the counter begins counting, and when the counter reaches a preset value, the counter is reset and the judgment unit considers the command of the decoded data packet to be received for the first time.

4. The cascade extension device according to claim 1, further comprising:
a buffer module connected to the control module and the extension device input terminal, wherein the data packet is temporarily stored in the buffer module;
a storage module connected to the control module and the buffer module and configured to store a functional program and read data of an application device; and
a selecting output module connected to the control module, the buffer module, and the storage module and configured to receive the read data or the data packet;
wherein the extension device output terminal is connected to the selecting output module and configured to output the read data or the data packet;
wherein when the judgment unit judges that the command of the decoded data packet is a write command, the control module writes decoded data into the functional program, and when the judgment unit judges that the command of the decoded data packet is a read command, the control module outputs the read data to the selecting output module, and when the judgment unit judges that the command of the decoded data packet is not received for the first time, the command is considered to be a bypass command, and the judgment unit sends the data packet to another cascade extension device through the extension device output terminal.

5. The cascade extension device according to claim 4, wherein the data packet comprises a command code, and the judgment unit reads the command code to judge that the data packet is the write command or the read command.

6. The cascade extension device according to claim 5, wherein when the command code read by the judgment unit is the same as the command code of a previous data packet, the data packet is judged to be the bypass command.

7. The cascade extension device according to claim 4, wherein the control module comprises a counter and the judgment unit reads a count value of the counter to judge that the data packet is the write command, the read command, or the bypass command.

8. A cascade system, comprising:
a processor comprising an output terminal and an input terminal, and configured to output a plurality of data packets sequentially through the output terminal thereof; and
a plurality of extension devices as the cascade extension devices, wherein an input terminal of a first extension device among the plurality of extension devices is connected to the output terminal of the processor, an output terminal of a final extension device among the plurality of extension devices is connected to the input terminal of the processor, and an output terminal of one of other extension devices among the plurality of extension devices is connected to an input terminal of a next extension device;
wherein each of the plurality of extension devices judges that a command of the data packet received is a write command, a read command, or a bypass command, and when the command of the data packet received is the write command, the data packet is decoded to obtain parameter data of an application device, and the parameter data are written into a functional program of the application device, and when the command of the data packet is the read command, read data of the application device are outputted, and when the data packet is the bypass command, each of the plurality of extension devices bypasses the data packet received to the next extension device;
wherein upon receiving the command of the data packet, each of the plurality of extension devices judges whether the command of the data packet is received for a first time, when the command of the decoded data packet is received for the first time, the command is executed by the extension device receiving the command, and when the command of the decoded data packet is not received for the first time, the data packet is sent to another cascade extension device.

9. The cascade system according to claim 8, wherein the cascade system comprises a quantity detection mode, and in the quantity detection mode, the processor sequentially sends a plurality of detection packets to the plurality of extension devices and judges a quantity of the plurality of extension devices based on a send sequence value of detection packet firstly received by the input terminal of the processor.

10. The cascade system according to claim 9, wherein the processor sets a command loop of the data packet based on the quantity of the plurality of extension devices.

11. The cascade system according to claim 9, wherein when the plurality of detection packets outputted by the processor reaches a preset sending limit and the input terminal of the processor has not received any of the plurality of detection packets, the processor enters a device debug mode, the output terminal of the processor sequentially sends a debug packet to the plurality of extension devices, the plurality of extension devices return reply data through the input terminals thereof to the output terminal of the processor after receiving the debug packet, and the processor judges an error position of the plurality of extension devices based on the send sequence value corresponding to the reply data not received through the output terminal.

12. The cascade system according to claim 8, wherein in a device debug mode, the processor outputs a debug command, the processor sequentially sends a debug packet to the plurality of extension devices through the output terminal thereof, the plurality of extension devices return reply data through the input terminals thereof to the output terminal of the processor after receiving the debug packet, and the processor judges an error position in the plurality of extension devices based on a send sequence value corresponding to the reply data not received through the output terminal.

13. The cascade system according to claim 8, wherein the data packet comprises a final command, and each of the plurality of extension devices is switched between a status of executing the write command and a status of executing the read command after receiving the final command.

* * * * *